US012291809B1

(12) United States Patent
Hagerty et al.

(10) Patent No.: US 12,291,809 B1
(45) Date of Patent: May 6, 2025

(54) DEVICE TO APPLY DECORATIVE TRIM TO TEXTILE SURFACES

(71) Applicant: Nora Hagerty, Park City, UT (US)

(72) Inventors: Nora Hagerty, Park City, UT (US); Ryan Schmeltz, Edwardsburg, MI (US)

( * ) Notice: Subject to any disclaimer, the term of this patent is extended or adjusted under 35 U.S.C. 154(b) by 111 days.

(21) Appl. No.: 18/086,197

(22) Filed: Dec. 21, 2022

(51) Int. Cl.
| | | |
|---|---|---|
| *B29C 65/00* | (2006.01) | |
| *C09J 5/06* | (2006.01) | |
| *D04D 9/00* | (2006.01) | |
| *D06C 23/00* | (2006.01) | |
| *D06C 27/00* | (2006.01) | |
| *D06H 5/00* | (2006.01) | |
| *B29C 65/02* | (2006.01) | |
| *B29C 65/48* | (2006.01) | |
| *B29C 65/50* | (2006.01) | |
| *B29C 65/52* | (2006.01) | |

(Continued)

(52) U.S. Cl.
CPC ............... *D06C 27/00* (2013.01); *C09J 5/06* (2013.01); *D04D 9/00* (2013.01); *D06C 23/00* (2013.01); *D06H 5/00* (2013.01); *B29C 65/02* (2013.01); *B29C 65/4815* (2013.01); *B29C 65/50* (2013.01); *B29C 65/524* (2013.01); *B29C 65/7419* (2013.01); *B29C 65/745* (2013.01); *B29C 65/7891* (2013.01); *B29C 65/7894* (2013.01); *B29C 66/02241* (2013.01); *B29C 66/0242* (2013.01); *B29C 66/431* (2013.01); *B29C 66/4332* (2013.01); *C09J 2203/358* (2020.08)

(58) Field of Classification Search
CPC ..... B29C 65/02; B29C 65/4815; B29C 65/50; B29C 65/524; B29C 65/7419; B29C 65/745; B29C 65/7891; B29C 65/7894; B29C 66/02241; B29C 66/0242; B29C 66/431; B29C 66/4332
See application file for complete search history.

(56) References Cited

U.S. PATENT DOCUMENTS

| | | | |
|---|---|---|---|
| 2,307,406 | A | 1/1943 | Howard |
| 3,193,433 | A | 7/1965 | Tillotson |
| 3,274,038 | A | 9/1966 | Karn |

(Continued)

FOREIGN PATENT DOCUMENTS

| | | |
|---|---|---|
| DE | 8905144 U1 | 6/1989 |
| JP | 2006002326 A | 1/2006 |

(Continued)

*Primary Examiner* — Philip C Tucker
*Assistant Examiner* — Nickolas R Harm
(74) *Attorney, Agent, or Firm* — Krieg De Vault LLP; Daniel Tychonievich

(57) ABSTRACT

A device to apply a trim to textile surfaces is provided that can cut, fold, and adhere end pieces of the trim. The device includes a material holder assembly configured to hold and dispense a roll of trim material and a roll of adhesive material; a control and heating assembly including control inputs, status indicators, control electronics, a heating element and a heating chamber configured to receive the trim material and the adhesive material from the material holder assembly; and a cutting and forming compartment including drive rollers, a cutting device, a folding mechanism configured to fold cut ends of the trim material and the adhesive material, and pressing mechanisms to press the folded cut ends of the trim and adhesive material so that the folded ends are adhered to the remainder of respective trim material lengths.

14 Claims, 19 Drawing Sheets

(51) Int. Cl.
  *B29C 65/74*  (2006.01)
  *B29C 65/78*  (2006.01)

(56) References Cited

U.S. PATENT DOCUMENTS

| | | |
|---|---|---|
| 3,816,211 A | 6/1974 | Haigh |
| 4,007,835 A | 2/1977 | Klothe |
| 4,151,039 A | 4/1979 | Lash |
| 4,555,293 A | 11/1985 | French |
| 4,585,510 A | 4/1986 | Hadjiskakis et al. |
| 4,718,971 A | 1/1988 | Summers |
| 5,682,618 A | 11/1997 | Johnson et al. |
| 5,851,348 A | 12/1998 | Muenzer et al. |
| 6,079,343 A | 6/2000 | Wong |
| 6,129,977 A | 10/2000 | Riordan |
| 7,713,606 B2 | 5/2010 | Kasahara et al. |
| 8,006,734 B2 | 8/2011 | Hajny et al. |
| 8,746,313 B2 | 6/2014 | Kropp |
| 9,012,003 B2 | 4/2015 | Harward |
| 9,016,349 B2 | 4/2015 | Seitz |
| 9,540,207 B1 | 1/2017 | Chen |
| 10,220,601 B2 | 3/2019 | Roup et al. |
| 10,259,167 B2 | 4/2019 | Ellis et al. |
| 2005/0188907 A1 | 9/2005 | D'Henin |
| 2008/0000588 A1 | 1/2008 | Nakagawa et al. |

FOREIGN PATENT DOCUMENTS

| | | |
|---|---|---|
| JP | 2009195300 A | 9/2009 |
| KR | 20130004287 U | 7/2013 |

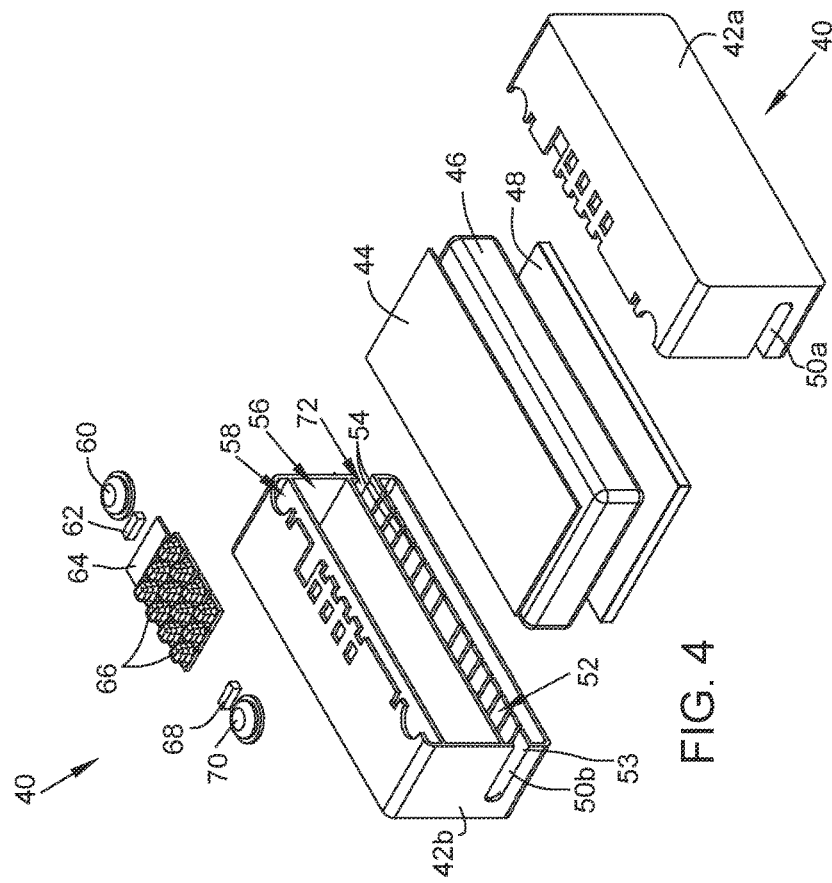
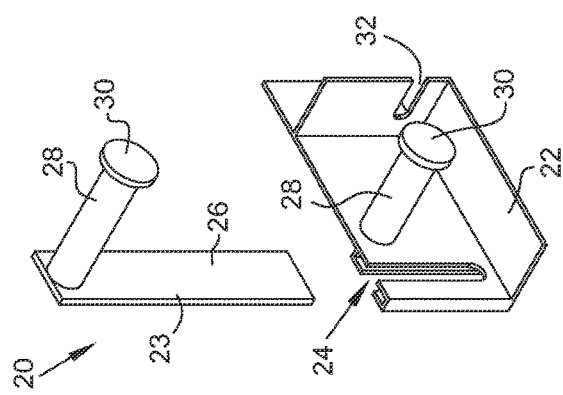
FIG. 4
FIG. 3

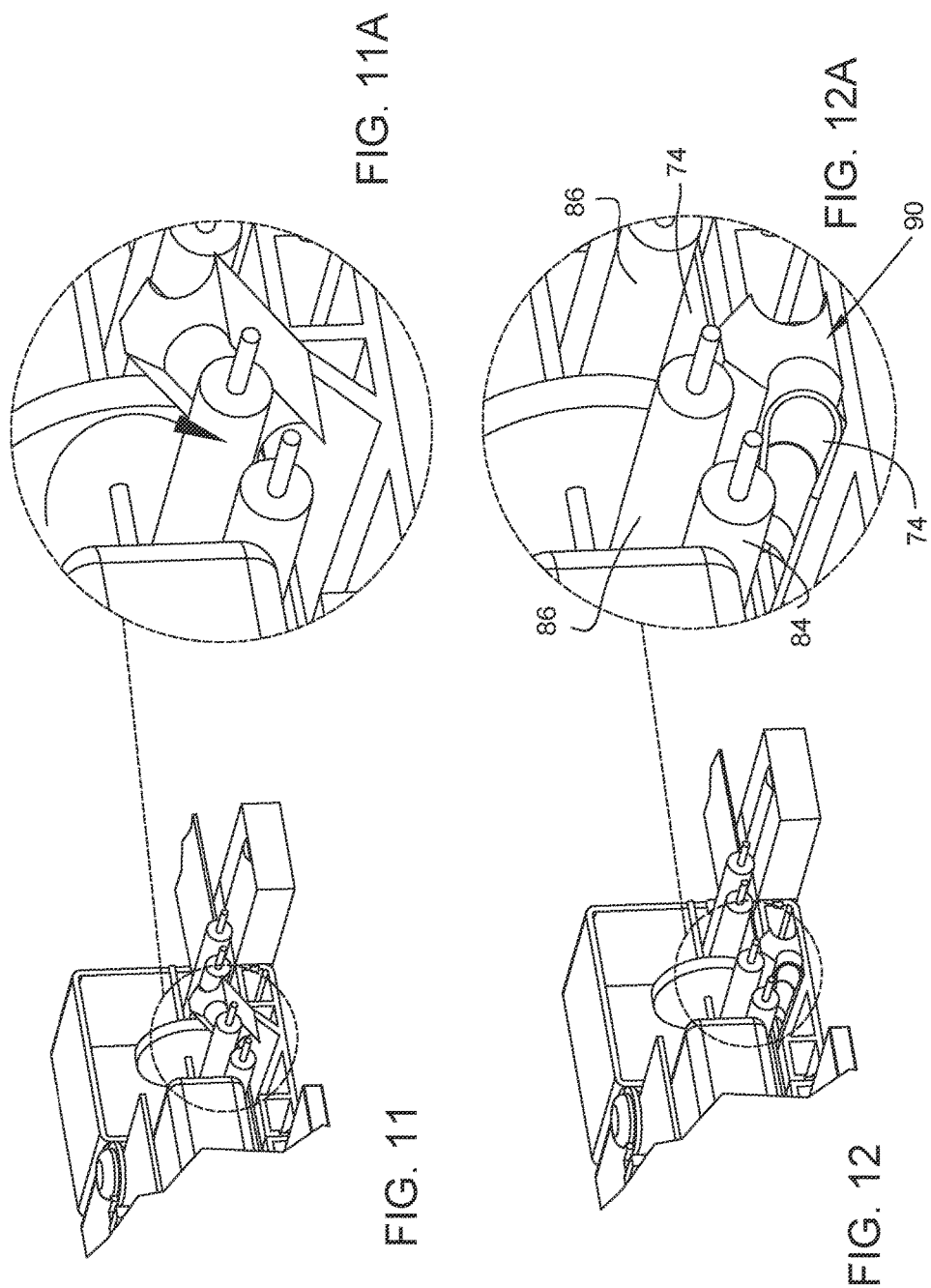

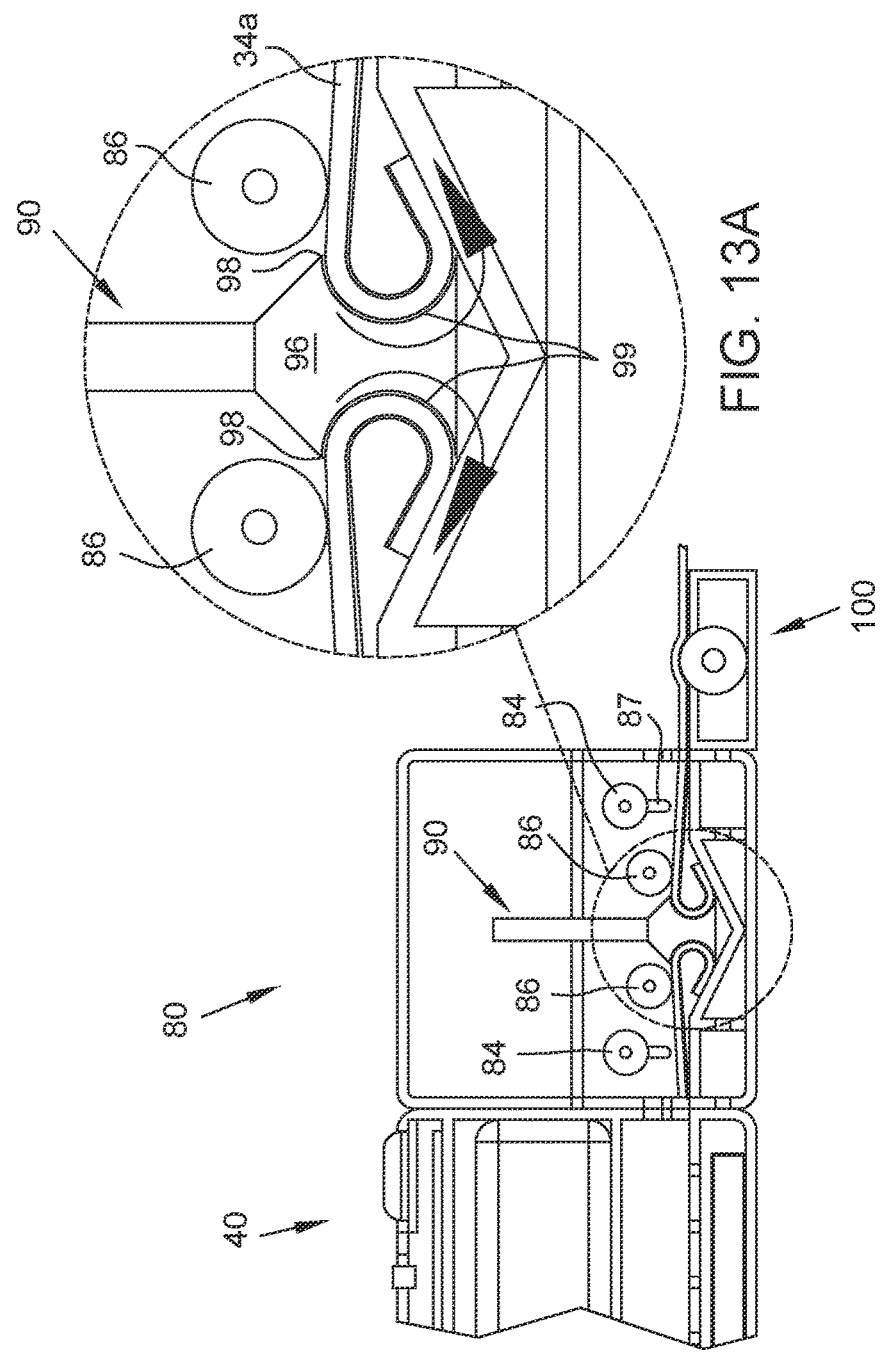

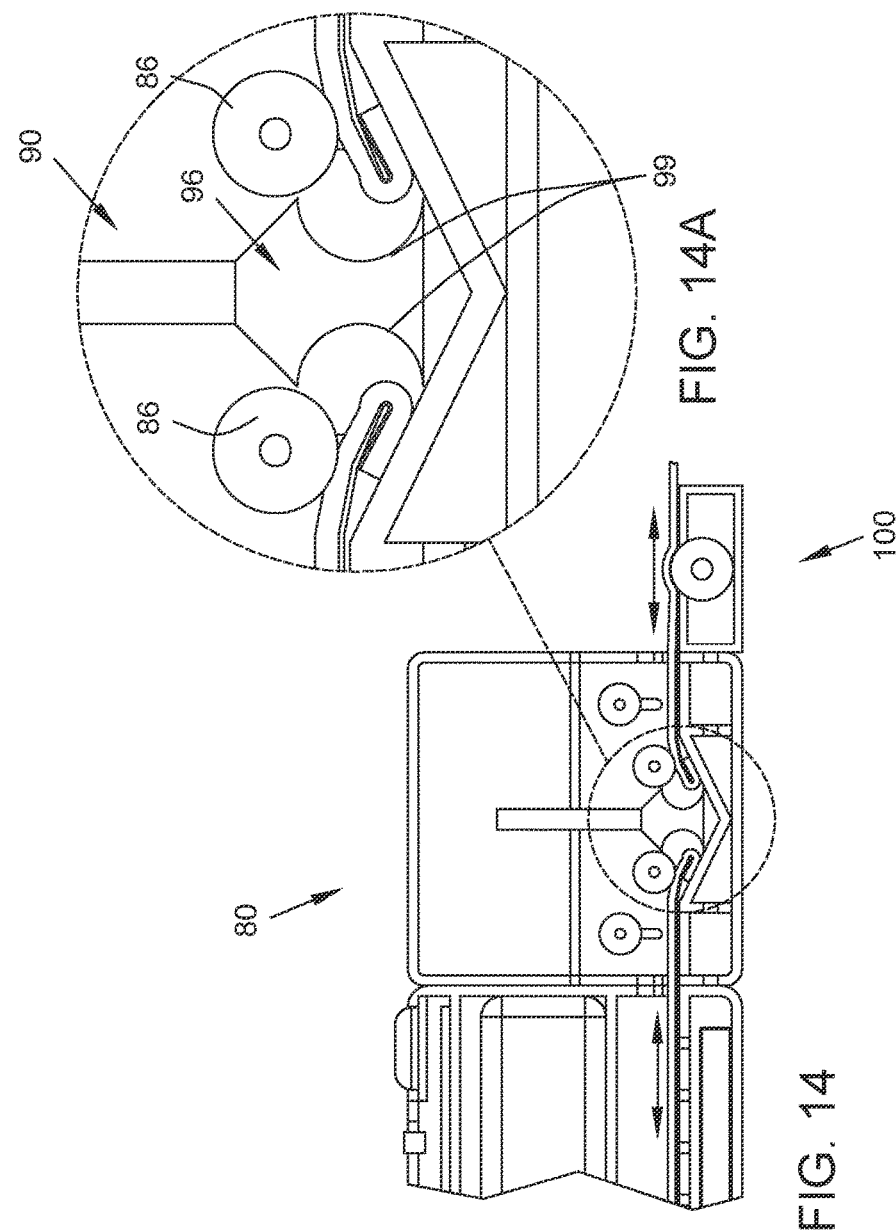

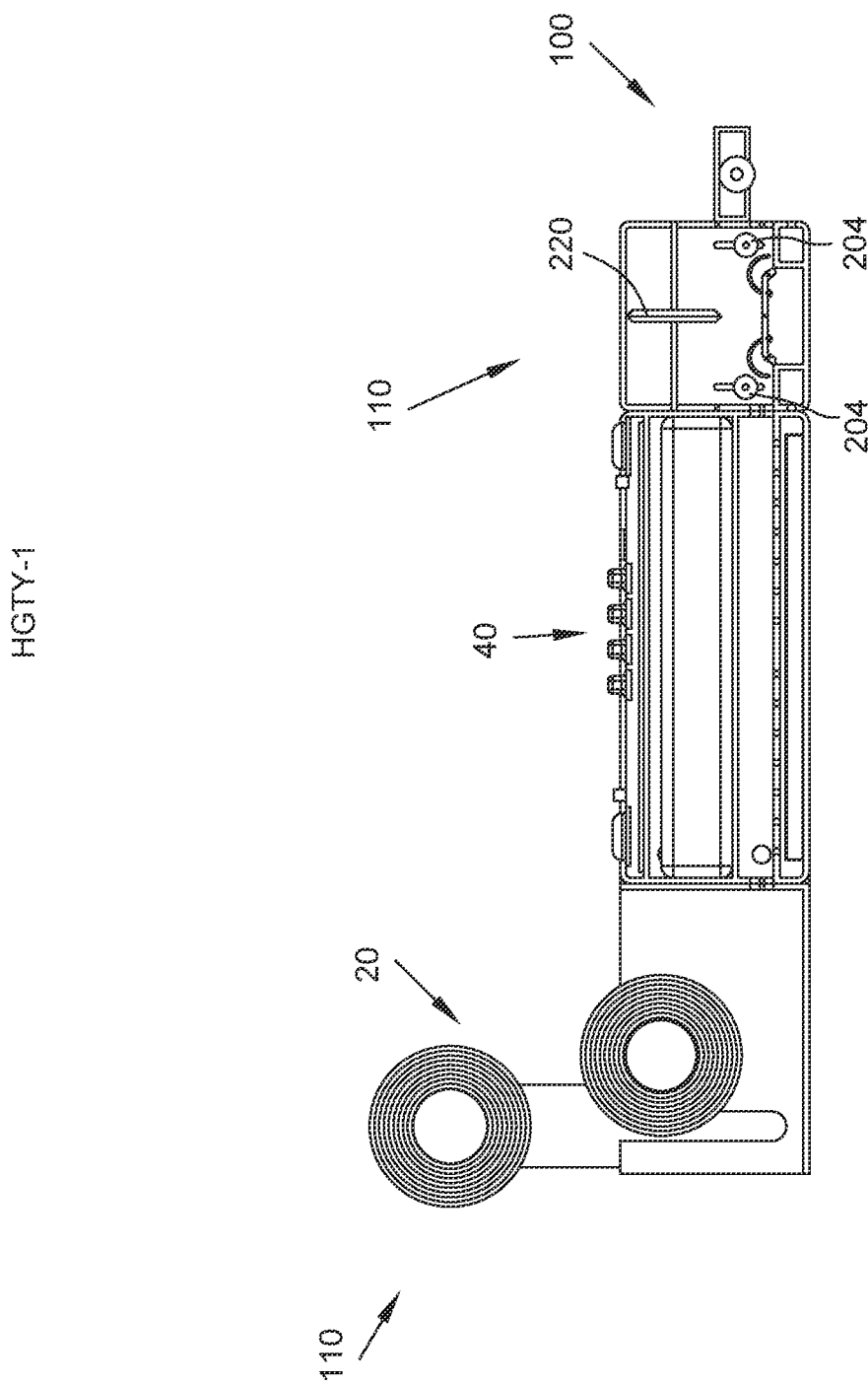

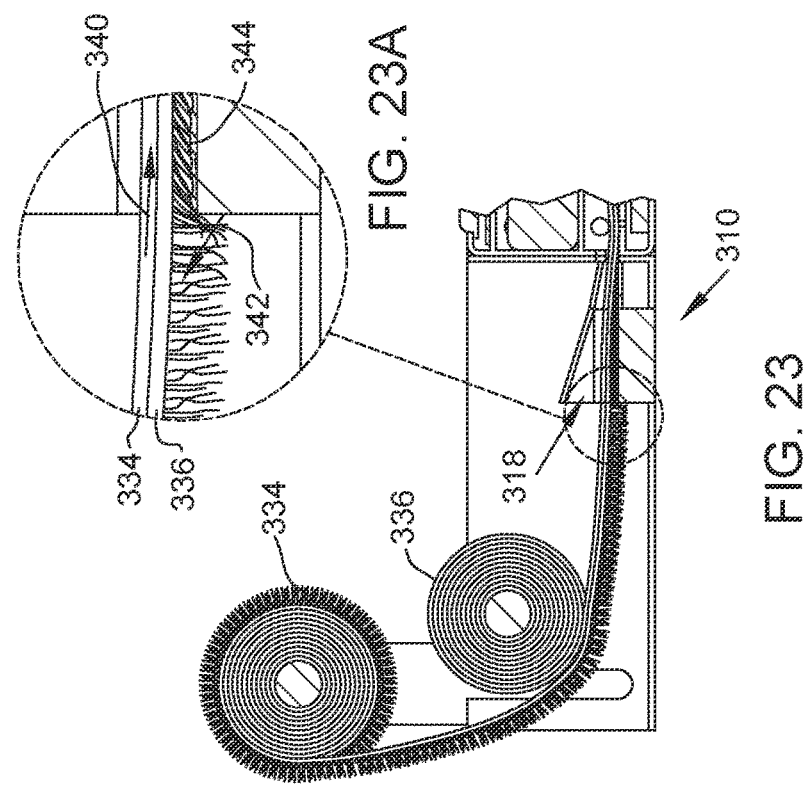

DEVICE TO APPLY DECORATIVE TRIM TO TEXTILE SURFACES

BACKGROUND OF THE INVENTION

This invention related to a machine that combines material and an adhesive strip, either with or without heat activation, and then cuts and folds the ends of the trim at a determined length. This creates the end of one piece of the trim and the start of the next piece of trim in one motion.

A variety of prior art devices are known to dispense trim pieces or tape to fabrics or textiles, but non include the unique features and advantages of the subject invention. US Patent Application Publication No. US 2008/0000588 A1 to Nakagawa et. al. discloses an adhesive tape joining apparatus. The main body of the apparatus is moved along a longitudinal direction of a workpiece by guiding it to be engaged with an edge of a workpiece. A tape portion protruding from the workpiece is folded back before a top of the edge by a pressing portion provided to the main body of apparatus while pressing it. The folded tape portion is pressed after a rear face of the edge by another pressing portion on the main body of the apparatus. The description of the device does not readily show how the above is accomplished.

U.S. Pat. No. 9,540,207 to Chen discloses a Tape Applicator having an Edge Folding Structure. The tape Applicator includes a main body and edge folding block. The edge folding block is provided with a transverse press board. A distance is defined between the flattening board and the reverse folding reinforcement block. An outer side of the reverse folding block is pivotally connected with a folding post. The tape applicator has a relatively simple structure and can be assembled with the folding post pivoting to the outer side of the reverse folding block. The tape applicator enables the tape to form a nonstick side edge exactly for the user to tear off the tape from a packing. The folding edge structure folds under a longitudinal side edge of the tap rather than folding under a termination end.

U.S. Pat. No. 2,307,406 to Howard discloses a method of applying sealing strips. The method and device apply a transparent tape and a narrow strip attached to the adhesive of the transparent strip that may include indicia or writing on the side of the narrow strip sealed to the adhesive on the transparent tape. The writing or indicia show through the transparent tape. If the narrow strip is close to the edge of the transparent tape, it leaves an unsealed strip of the transparent tape along one longitudinal edge, whereby when the tape is applied to a surface, one edge will remain adhesively free of the surface along one edge and provide a finger gripping piece for pulling the tape free from the surface. Howard does not disclose or show a folding device to fold the laminated strip over and tack down at the end to provide a finished appearance.

U.S. Pat. No. 6,129,977 to Riordan discloses a tape roll structure for use in marking edge tabs for sheets. A tape roll structure which includes a tape having adhesive on one face, and the tape can be pulled off a tape roll and cut into segments of varying lengths. The tape is provided with a paper tape or coating on one or both sides for receiving written indicia, and which becomes part of a tape segment. Thus, once a tape segment has been attached by adhesive to a marginal edge of a sheet, written indicia can be written on the paper tape or coating so that a tab is immediately formed on a sheet. In one embodiment, a pair of tape rolls are mounted in a shell, and one of the tape rolls carries a paper tape and the other tape roll carries adhesive tape. When the two tapes are pulled from their rolls, the paper tape moves into bonded engagement with one-half of the adhesive tape of the other roll. Then the tapes are cut into a segment and bonded to the sheet to which a tab is to be mounted. As such, the Riordan device has two rolls, one with an adhesive tape and one with a paper tape but does not show or disclose a folding device to fold the rolls over at ends and tack down to provide a finished appearance.

U.S. Pat. No. 3,193,433 to Tillotson discloses a dispensing apparatus. The dispensing apparatus has a roll of stamps and a roll of pressure-sensitive tape that are simultaneously pulled out as a continuous laminated strip. Tillotson does not disclose or show a folding device to fold the laminated strip over and tack down at the end to provide a finished appearance.

U.S. Pat. No. 7,713,60 to Kasahara et al. discloses an adhesive product and transferring Instrument. The patent asserts that the adhesive product provides excellent glue cutting performance and a good finish to the pasted portion while effectively maintaining security. An adhesive layer is formed through pattern application, where an adhesive 100 is intermittently placed on the surface of a film, so that a broken paper phenomenon, such that the surface layer portion of a flap or the vicinity of an opening adheres to the surface of the adhesive layer, and a white envelope is ripped in the direction of the thickness, can be caused when a peeling movement for peeling the flap from a state where the white envelope is sealed via the adhesive layer. This patent provides general background information for the invention.

German Patent Publication DE8905144 U1 provides general background information. The Figure shows an applicator device having two adhesive tapes.

SUMMARY OF THE INVENTION

In one embodiment of the invention, a device to apply a trim to textile surfaces is provided that can cut, fold, and adhere end pieces of the trim. The device includes a material holder assembly configured to hold and dispense a roll of trim material and a roll of adhesive material; a control and heating assembly including control inputs, status indicators, control electronics, a heating element and a heating chamber configured to receive the trim material and the adhesive material from the material holder assembly; and a cutting and forming compartment including drive rollers, a cutting device, a folding mechanism configured to fold cut ends of the trim material and the adhesive material, and pressing mechanisms to press the folded cut ends of the trim and adhesive material so that the folded ends are adhered to the remainder of respective trim material lengths.

The device can further include an adhesive compartment for applying adhesive to a cut and folded length of trim material for application to a textile piece.

The material holder assembly has a height adjustment to accommodate different sizes of rolls of trim and adhesive materials. The material holder assembly can include a base portion and a top portion, and the roll of trim material is mounted for rolling disbursement of the trim material from either the base or top portion, and the roll of adhesive material is mounted for rolling disbursement from the other of either the base or top portion. The base or top portion of the material holder assembly includes a receiving slot, and the other of the base or top portion includes an extension movably receivable in the receiving slot to facilitate the height adjustment of the material holder assembly.

The device can include a heating element compartment having openings in communication with the heating chamber to facilitate transfer of heat thereto. The heating element compartment is located below the heating chamber in one embodiment and heat transfers to the heating chamber by convection.

The cutting and forming compartment can include rollers as part of the pressing mechanisms. The drive rollers also act as pressing rollers of the pressing mechanisms.

The cutting device of the device can include a cutting and forming wheel including a cutting knife and a forming portion that folds the cut ends of the trim material. The cutting device can include a translatable wheel and the folding mechanism can include arced slots to facilitate movement of the folding mechanism. The drive rollers can be translatable for bringing into contact with and removing from the trim material.

The material holder assembly can include a funnel section for accommodating trim material having loose ends. The funnel section can include a surface for aligning fibers of the material.

In another feature of the invention a method for cutting, folding cut ends, pressing and adhering the cut ends of a trim material trimming is provided that includes the steps of: providing a material holder assembly configured to hold and dispense a roll of trim material and a roll of adhesive material; providing a control and heating assembly including control inputs, status indicators, control electronics, a heating element and a heating chamber configured to receive the trim material and the adhesive material from the material holder assembly; providing a cutting and forming compartment including drive rollers, a cutting device, a folding mechanism configured to fold cut ends of the trim material and the adhesive material, and pressing mechanisms to press the folded cut ends of the trim and adhesive material so that the folded ends are adhered to the remainder of respective trim material lengths; feeding the trim and adhesive material adjacent one another from the material holder assembly into the heating chamber; heating the trim and adhesive material to a predetermined temperature; moving the heated trim and adhesive material into the cutting and forming compartment; cutting the trim and adhesive material; folding ends of the cut trim material over itself; and pressing the folded ends to form finished end portions of the trim material.

The method for cutting, folding cut ends, pressing and adhering the cut ends of a trim material trimming can further include the steps of providing an adhesive compartment and moving a cut length of trim material from the cutting and forming compartment into the adhesive compartment. The method for cutting, folding cut ends, pressing and adhering the cut ends of a trim material trimming can further include the step of applying adhesive on the cut length of trim material for attachment to a textile piece. The adhesive compartment can also include an adhesive roller for applying adhesive to the length of trim material. A drive roller in the cutting or folding compartment can drive the length of trim material out of the cutting and folding compartment and onto the adhesive roller, The method for cutting, folding cut ends, pressing and adhering the cut ends of a trim material trimming can further include the step of providing a contoured forming tool on the folding mechanism and pressure rollers, and forming the trim material in contours of the forming tool with the pressure rollers.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein:

FIG. 3 is an exploded perspective view of a material holder of the device to apply decorative trim to textile surfaces;

FIG. 4 is an exploded perspective view of a control box of the device to apply decorative trim to textile surfaces;

FIG. 11 is a perspective view of the cutting and folding compartment with the end removed showing a trim piece extending through and exiting the compartment and showing the cutting and forming wheel rotated to encounter the trim piece with a forming portion of the cutting and forming wheel;

FIG. 11A is an enlarged perspective view in the area indicated of the cutting and folding compartment with the end removed showing the cutting and forming wheel rotated to encounter the trim piece with a forming portion of the cutting and forming wheel FIG. 12 is a perspective view of the cutting and folding compartment with the end removed showing a trim piece being cut and formed;

FIG. 12A is an enlarged perspective view in the area indicated of the cutting and folding compartment with the end removed showing a trim piece being cut and formed;

FIG. 13 is a side view of the cutting and folding compartment with the end removed showing a cut trim piece being folded back;

FIG. 13A is an enlarged side view in the area indicated of the cutting and folding compartment with the end removed showing a cut trim piece being folded back;

FIG. 14 is a side view of the cutting and folding compartment with the end removed showing a cut and folded trim piece being pressed;

FIG. 14A is an enlarged side view in the area indicated of the cutting and folding compartment with the end removed showing a cut and folded trim piece being pressed;

FIG. 18 is a side view of the alternate embodiment device to apply decorative trim to textile surfaces with the ends of the control box and cutting and folding compartment removed;

FIG. 23 is a side view of the material holder assembly holder a holding a roll of trim material and a roll of adhesive material.

Figure 1:
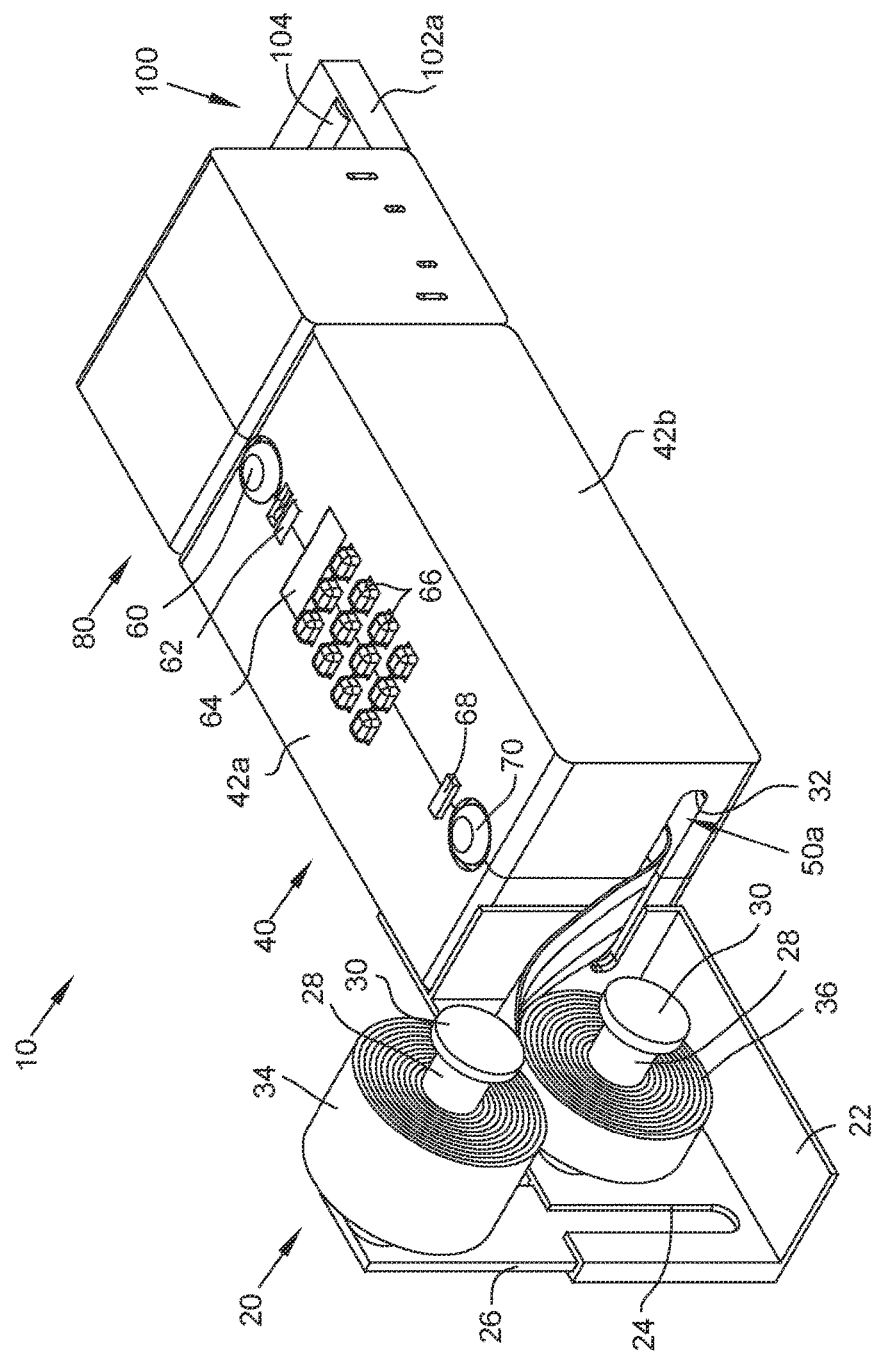
FIG. 1 is a perspective view of one embodiment of a device to apply decorative trim to textile surfaces.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Referring now to FIGS. 1-15, a first embodiment of a machine or device for applying a decorative trim piece to a textile surface is generally indicated as 10. Device 10 has parts including a material holder assembly generally indicated as 20, a control box generally indicated as 40, a cutting and formatting compartment generally indicated as 80, and an adhesive compartment generally indicated as 100.

As can be seen in FIG. 1, all of the parts of device 10 can be interlocked so that each can be separated and replaced if one of the components malfunctions or breaks. The interlocking can be done using locking tabs, sliding dovetails, or other ways that would be commonly utilized by someone skilled in the art. Additionally, device 10 can include electrical connections that automatically connect once the components are connected together, again utilizing technology known to one that is skilled in the art.

Figure 2:
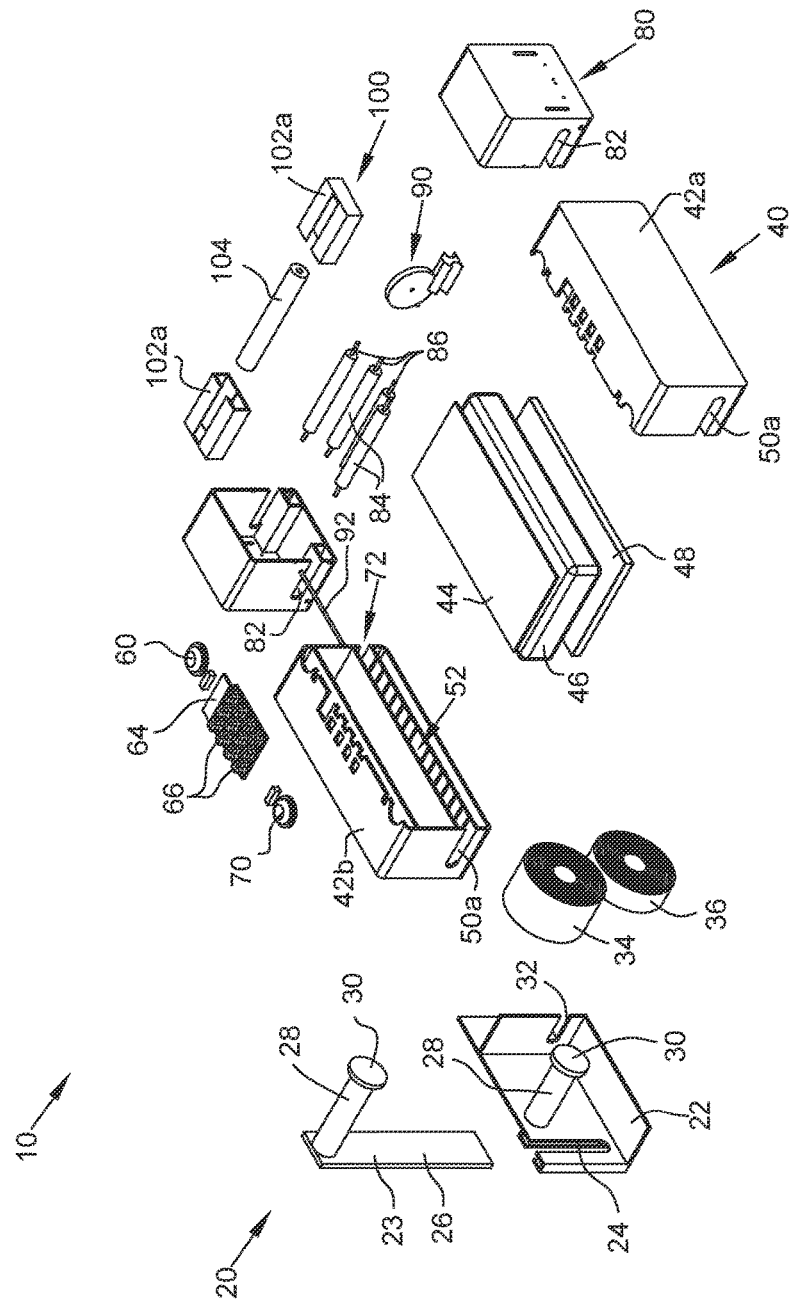
FIG. 2 is an exploded perspective view of the device to apply decorative trim to textile surfaces as set forth in FIG. 1.
Figure 5:
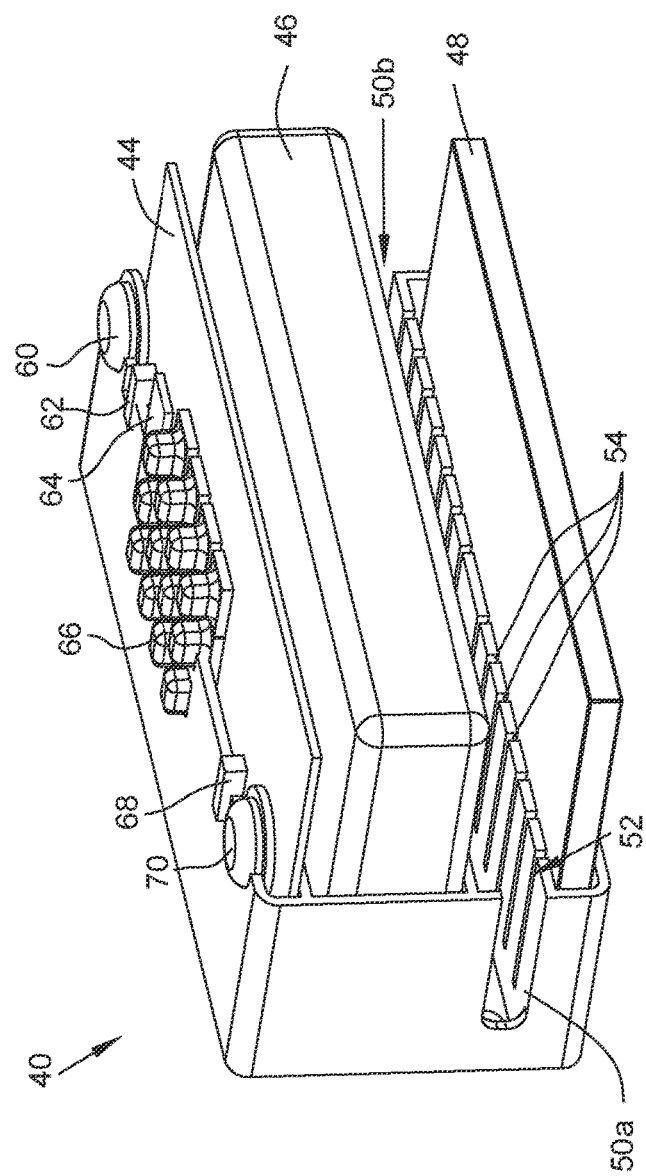
FIG. 5 is an assembled perspective view of the control box of the device to apply decorative trim to textile surfaces.
Figure 6:
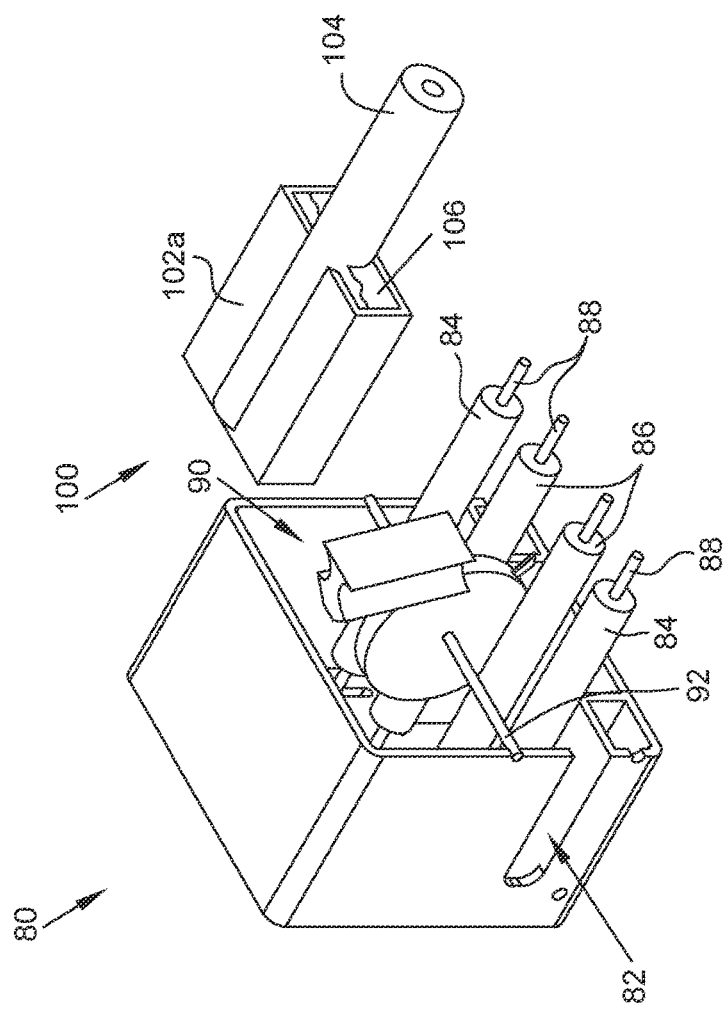
FIG. 6 is a perspective view of a cutting and folding compartment and adhesive portion of the device to apply decorative trim to textile surfaces.
Figure 7:
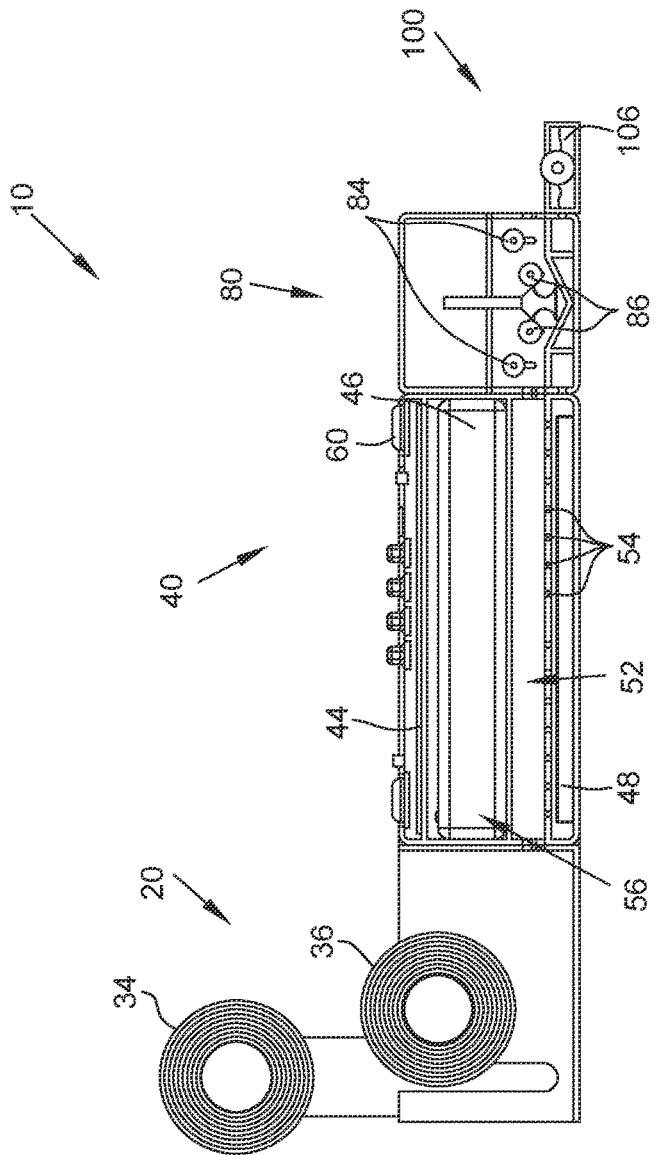
FIG. 7 is a side view of the device to apply decorative trim to textile surfaces with the ends of the control box and cutting and folding compartment removed.
Figure 9:
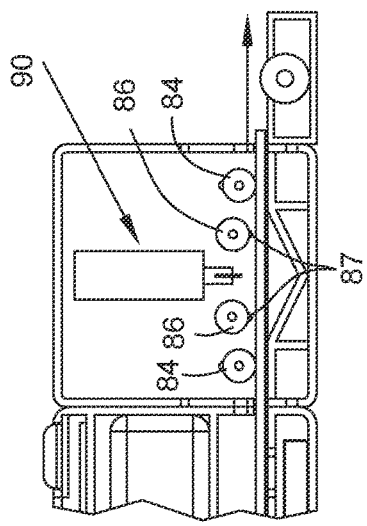
FIG. 9 is a side enlarged view of the cutting and folding compartment with the end removed and showing a trim piece extending through and exiting the compartment.
Figure 8:
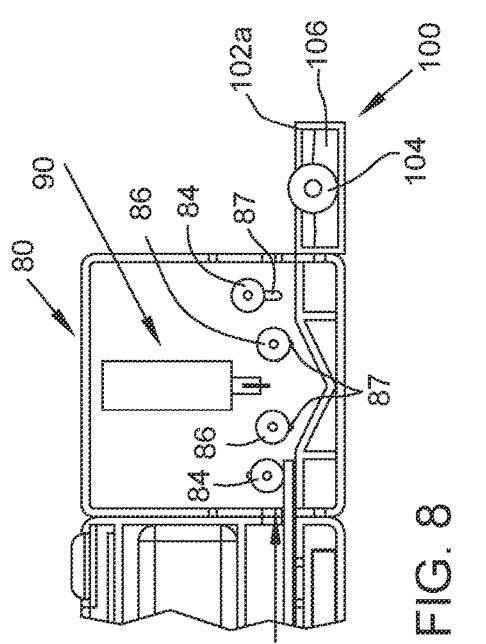
FIG. 8 is a side enlarged view of the cutting and folding compartment with the end removed and showing a trim piece entering the compartment and in contact with a drive roll.
Figure 10:
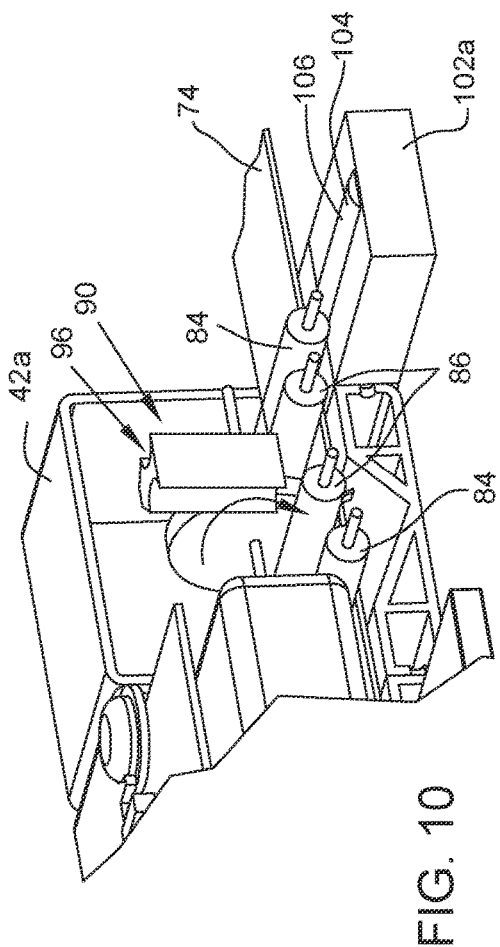
FIG. 10 is a perspective view of the cutting and folding compartment with the end removed and showing a trim piece extending through and exiting the compartment and showing the motion of a cutting and forming wheel.
Figure 15:
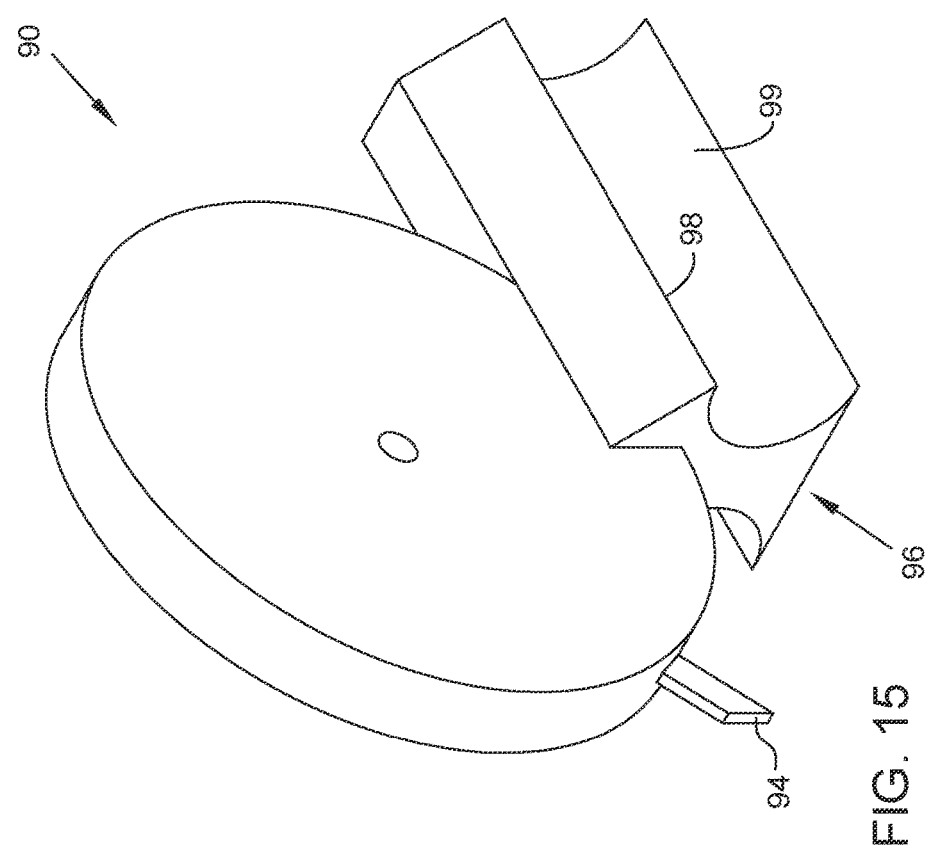
FIG. 15 is a perspective view cutting and forming wheel, forming portion and cutting surface.

The configuration of machine 10 with material holder assembly 20, includes two main parts or portions, a base portion 22 and a top portion 23, as best shown in FIGS. 2 and 3. Referring to FIG. 3, the base portion 22 of material holder assembly 20 includes a rod 28 for holding rolls of adhesive material 36, the rod having a boss 30 at the end of it, which allows the adhesive material 36 to roll and not fall off of the rod. Base 22 also contains a slot 24 that corresponds to and is configured to receive and hold top portion 23 of the material holder, that includes a tongue 26 which slidably engages the slot in the base.

The top portion 23 of the base also includes a rod 28 for holding rolls of trim material 34 and an end boss 30. The slidable tongue 26 and slot 24 allows for the top portion 23 to slide up and down and accommodate rolls trim material 34 of different sizes.

Referring to FIGS. 1-5, in the embodiment shown, control box 40, is manufactured into two halves 42a, b, and includes of a power button 60, a power LED 62, a LCD screen 64 for providing information, Input Buttons 66, a heater button 70, and a heater LED 68 which shows when the heater is operational.

Control box 40 further includes of a circuit board 44, which controls the entire machine. Circuit board 44 is housed in a circuit board compartment 58 (see FIG. 4). Control box 40 further includes a rechargeable battery pack 46, which is housed in a battery compartment 56, for mobile applications, and a heating element 48, which is housed in a heating element compartment 55.

Control box 40 also has a heating chamber 52 that the trim material combo passes through and slots 54 in a wall 53 of heating element compartment 55 that is in communication with heating chamber 52. Slots 54 facilitate heat in the heating element compartment 55 to naturally convect heat from the heating element 48 to rise and enter the heating chamber 52 to heat chamber 52 to a predetermined temperature.

Referring to FIGS. 6-15, the cutting and forming compartment 80 of device 10 includes a beginning opening 82 for the trim 34 and adhesive 36 to enter therethrough to keep it aligned, drive rollers 84 rotatable on an axles 88, two pressure rollers 86, also rotatable on axles 88, a cutting and forming wheel 90, which is includes a cutting portion 94 (FIG. 15) and a forming portion 96.

In the embodiment shown, cutting portion 94 is comprised of a boss coming out of the forming wheel 90, which has a sharpened cutting surface for cutting the material 34 and the adhesive 36.

The forming portion 96 of forming wheel 90 is comprised of a front edge 98. Once the trim material 34 and adhesive material 36 is cut by cutting portion 94, front edge 98 folds trim 36 downwards and back towards itself, starting to create a tucked portion of the trim (see FIGS. 13-14).

There is also a cylindrical surface 99 of the forming wheel 90, which the trim 36 will ride against to create larger or smaller tucks to the end of the trim 36.

Once the rolls of material 34 and adhesive 36 are put onto the material holder assembly 20 and placed accordingly, an operator starts by taking the starting end of the material, and the starting end of the adhesive 36, place them together, and put them through a feed slot 32 in the base 22 of material holder assembly 20.

This combination of material 34 and adhesive 36 will be inserted into the slot 32 for the material combination 34,36 to enter an opening 50a of control box 40 and is pushed through the heating chamber 52, and out through the exit slot 50b in the control box.

The operator or user then pushes the power button 60, which activates the power led 62 and the LCD screen 64. The operator then also pushes the heater power button 70, which lights up the heater LED 68 showing that the heater 48 is heating up. Once the heater 48 has reached a predetermined temperature, the operator will input the length of the trim 34 needed using the input buttons 66. The length will show up on the LCD screen 64.

The machine 10 will then send a motor a signal which will then rotate the drive rollers 84. The drive rollers 84 are attached to a motor by typical means known to someone skilled in the arts, such as a drive belt or gears.

The drive rollers 84, then moves the material and adhesive combination 34,36 forward such that a second drive roller 84 also engages the material adhesive combination 34,36 so as to keep the combination taut to facilitate cutting it.

Once the material 34,36 is taut, the control then sends a signal to a motor or other drive mechanism to position the cutting and forming wheel 90 into place, and to start rotation of the cutting and forming wheel 90 on an axle 92, such that the small boss/knife with a front cutting edge 94 will engage the material and adhesive combination 34,36 and cut the combination.

The cutting and forming wheel 90 continues to rotate forward until the forming portion 96 is into place (see FIG. 13A).

The front edge 98 of forming portion 96 is designed such that as it is being rotated, it starts to fold the front edge of the trim adhesive combo 34,36 back towards itself. It does this on both the ends 34a of a first piece of trim as well as the start 34b of a second piece of trim.

Once the forming portion 96 of the forming wheel 90 is in place, then the entire edge of the trim is facing back towards itself (see FIGS. 13,13A). The control then sends a signal to the drive rollers to move both pieces of trim so that there is more of the undertucked portion of the trim. Then the control sends a signal to the pressure rollers 86 lowering them in place to a preset amount of pressure such that the adhesive sticks to itself and forms a tucked portion of the trim (see FIGS. 14, 14A).

The control then sends a signal to the motor to the drive rollers 84, which then move the tucked portion back and forth such that the pressure rollers 86 apply pressure to the entire portion of the tucked ends. Once that is completed, the cutting and forming wheel 90 is then rotated back upwards and out of the way and the pressure rollers 86 upwards and out of the way, allowing the 2 pieces of trim 34a,b to be driven forward by the drive rollers 84.

As the trim exits the cutting and forming compartment 80, it exits directly above an adhesive roller portion 100. The operator pushes the finished trim 34a on top of the adhesive roller 104, which rotates and applies a liquid adhesive 106 onto the final trim piece 34a to be attached to the garment.

Now referring to FIGS. 16-19E, an alternate embodiment machine or device, generally indicated as 110. Device 110 includes a material holder assembly generally indicated as 20, a control box 40, a cutting and forming compartment 200, and adhesive compartment 100. It should be noted that material holder assembly 20 and control box 40 a essentially the same as for device 10.

Figure 16:
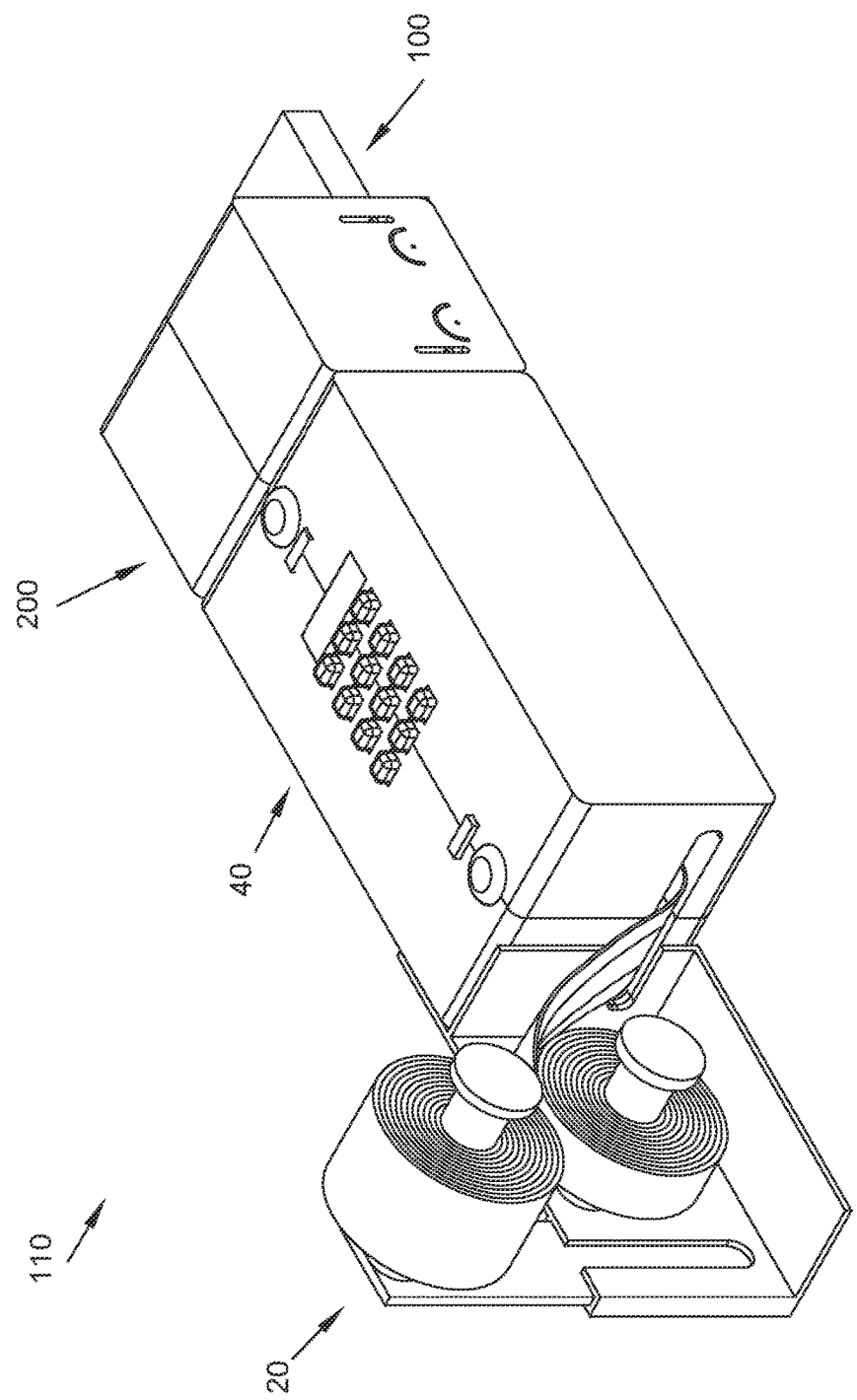
FIG. 16 is a perspective view of an alternate embodiment of a device to apply decorative trim to textile surfaces.

As can be seen in FIG. 16, all of the pieces can be interlocked so that each can be separated and replaced if one of the components fails. This can be done by using locking tabs, sliding dovetails, or by other means that commonly utilized by someone skilled in the arts. Additionally, device 10 can utilize electrical connections that connect once the components are connected together, again utilizing technology known to one skilled in the art.

Figure 17:
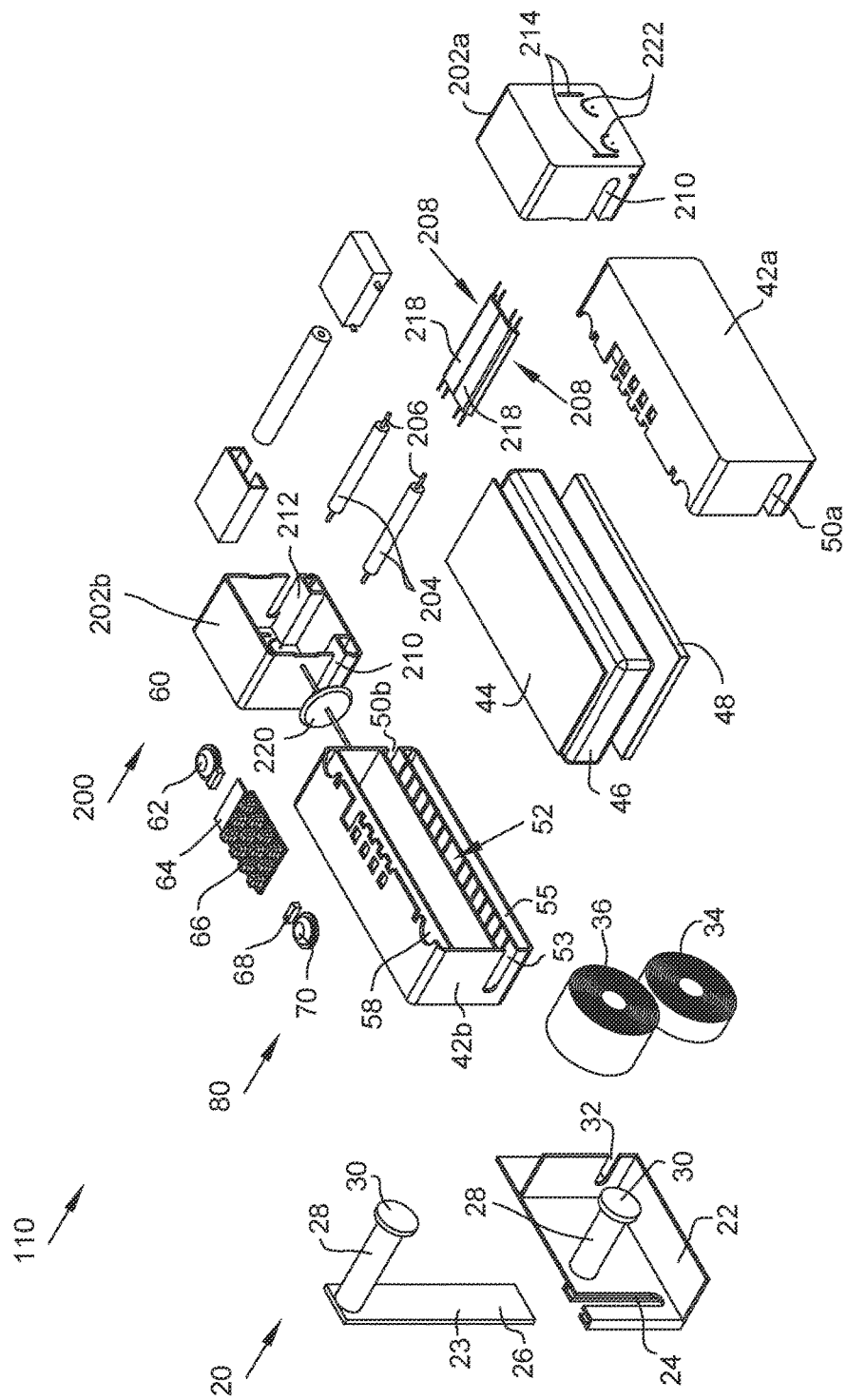
FIG. 17 is an exploded perspective view of the device to apply decorative trim to textile surfaces as set forth in FIG. 16.

The material holder assembly 20, of this embodiment has two parts, a base portion 22 and a top portion 23. Referring to FIG. 17, the material holder assembly 20, is includes a base 22, which contains a rod 28 for holding rolls of trim materials 34, the rod having a boss 30 at the end of it, which allows the trim material 34 to roll and not fall off of the rod 28. The base 22 also contains a slot 24 that is configured to receive to top portion 23 of the material holder assembly 20. Top portion 23 includes a tongue 26 which slidably engages the slot 24 in the base 22.

The top portion 23 of the material holder assembly 20 also includes a rod 28 for holding rolls of adhesive material 36 and an end boss 30. This allows for the top portion 23 to slide and accommodate rolls of trim material 34 and adhesive material 36 of different sizes.

Device 110 also has a control box portion 40, made into two halves 42a, b. Control box 40 includes a power button 60, a power LED 62, a LCD screen for information 64, Input Buttons 66, a heater button 70, and a heater LED 68 which shows when the heater 48 is operational.

Control box 40 also includes a circuit board 44, which controls the entire machine 110. The circuit board 44 is housed in a circuit board compartment 58. Device 110 also includes a rechargeable battery pack 46, which is housed in a battery compartment 56, for mobile applications, and a heating element 48, which is contained in a heating element compartment 55.

There is also a heating chamber 52 that the trim material combo 34, 36 passes through with slots 54 in the wall 53 between the heating chamber 52 and the heating element 48 compartment 55 to allow for natural convection of heat generated by the heating element 48 to rise and enter the heating chamber 52 and heat it to a predetermined temperature.

Device 110 also includes a cutting and forming compartment 200 that includes a beginning opening 210 for the trim material combination 34, 36 to enter therethrough to keep it aligned; drive rollers 204 rotatable on an axles 206, the two power rollers 206 also acting as pressure rollers, and also rotatable on axles 206 and movable in slots 21; and, a cutting and forming wheel 220.

Figure 19A:
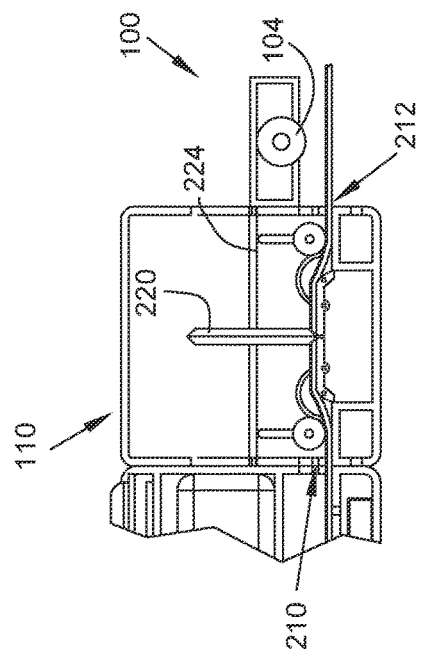
FIG. 19A is a side view of the cutting and folding compartment with the end removed showing a trim piece extending through and exiting the compartment and showing a cutting wheel and flipping mechanism.
Figure 19C:
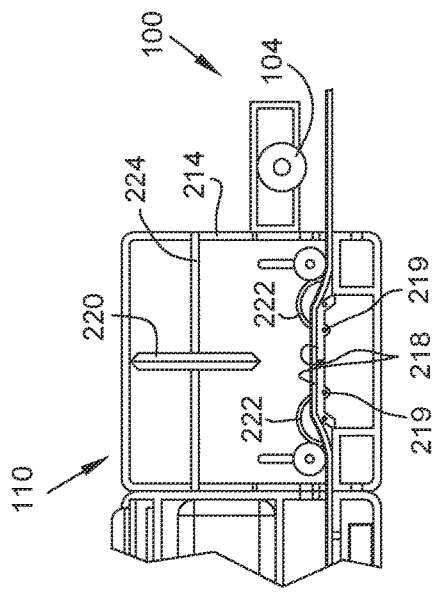
FIG. 19C is a side view of the cutting and folding compartment with the end removed showing the cut trim piece folded or flipped back.

Additionally, forming compartment includes two flipping mechanisms 218, that ride on a pivot rods 219, and are guided by arced slots 222 (see FIGS. 19A and 19C). The flipping mechanisms 218 can be actuated by any means known to someone skilled in the art, such as gears, belts, or a mechanical linkage.

Referring now to Figure. 17, you can see a roll of material 34 as well as a roll of adhesive 36. Once the rolls of trim material 34 and adhesive 36 are put onto the material holder assembly 20 and are placed accordingly, the operator starts by taking the starting end of the trim material 34 and the starting end of the adhesive 36, placing them together, and put them through the feed slot 32 in the base material holder 22.

This combination of trim material 34 and adhesive 36 will be inserted into the slot for the material to enter 50a, and pushed through the heating chamber 52, and out through the exit slot 50b in the control box 40.

The operator then pushes the power button 60, which activates the power led 62 and the LCD screen 64. The operator next pushes the heater power button 70 which lights up the heater LED 68 showing that the heater 48 is heating up. Once the heater 48 has reached a predetermined temperature, the user will input the length of the trim 34,36 needed using the input buttons 66. The length shows up on the LCD screen 64.

The machine 110 will then send a motor a signal which to rotate the drive rollers 204. The drive rollers are attached to the motor by typical means known to someone skilled in the arts such as a drive belt or gears. A first roller 204 then moves the material 34 and adhesive 36 combination forward such that a second drive roller 204 also engages the material adhesive combination so as to keep the combination taut so that it can be cut.

Figure 19B:
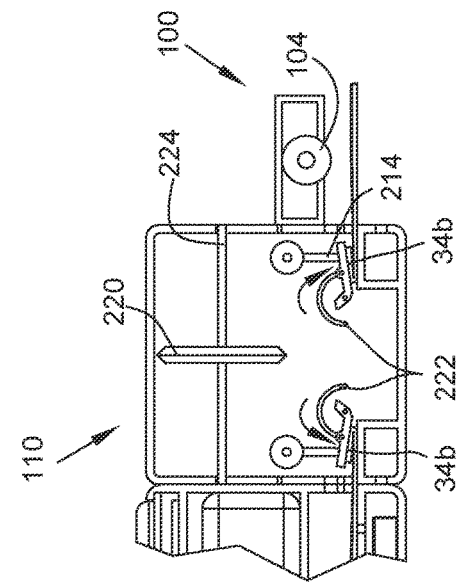
FIG. 19B is a side view of the cutting and folding compartment with the end removed showing the cutting wheel being brought into contact with the trim piece.
Figure 19D:
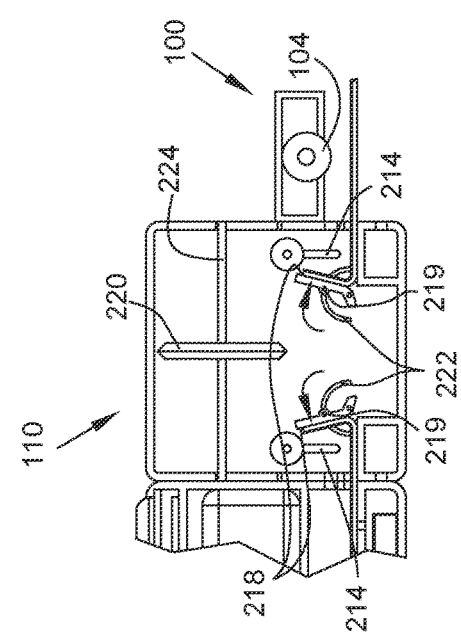
FIG. 19D is a side view of the cutting and folding compartment with the end removed showing the cut trim piece with ends folded down on itself.
Figure 19E:
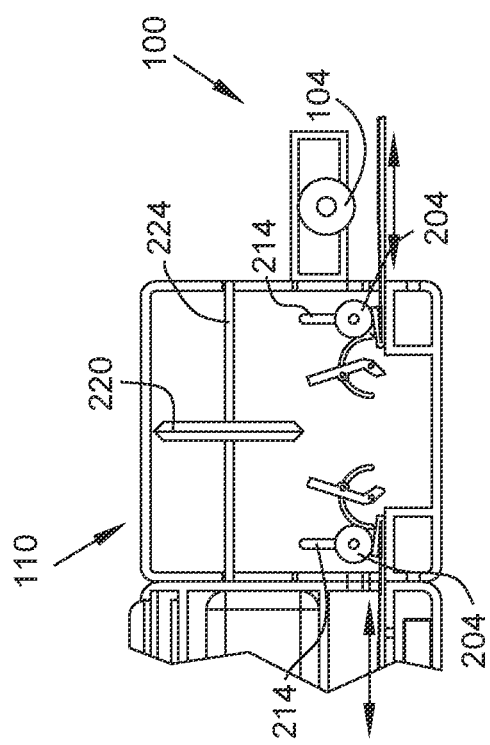
FIG. 19E is a side view of the cutting and folding compartment with the end removed showing the cut trim piece with ends folded down and being pressed by rollers.
Figure 20:
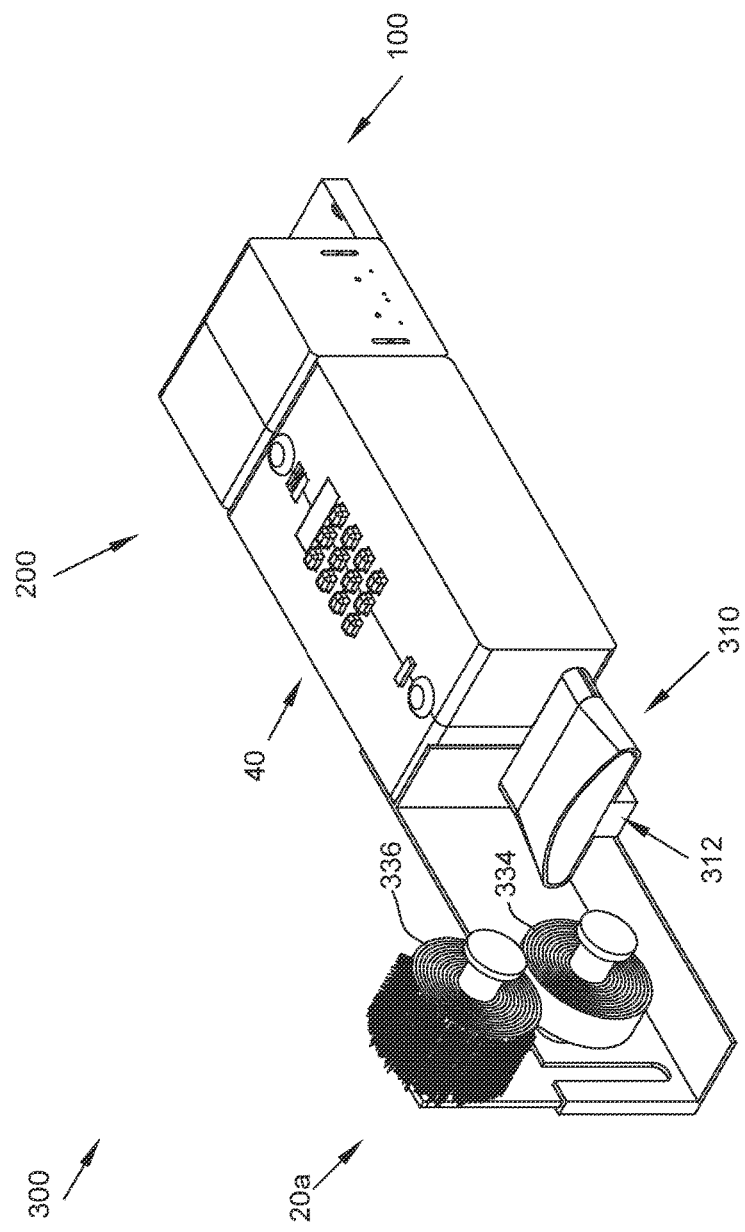
FIG. 20 is a perspective view of an additional embodiment of a device to apply nonuniform or highly textured decorative trim to textile surfaces.
Figure 22:
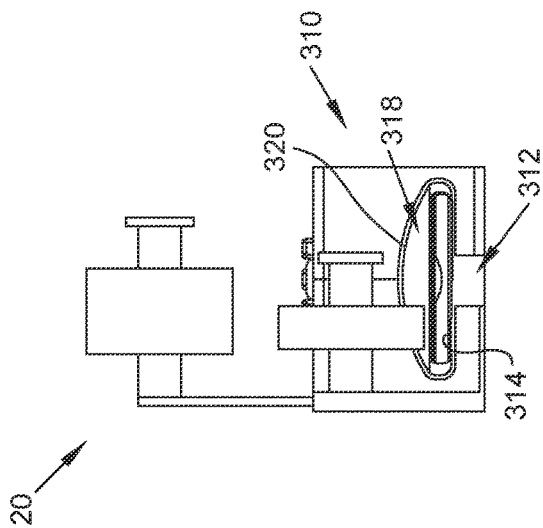
FIG. 22 is an end view of a the device of FIG. 20 showing the funnel section to carry the nonuniform or highly textured decorative trim through the device.
Figure 21:
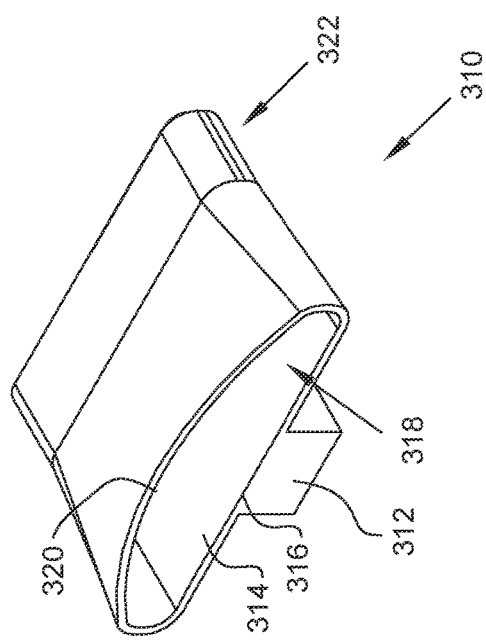
FIG. 21 is a perspective view of a funnel section to carry the nonuniform or highly textured decorative trim through the device.

Once the material is in position, the control then sends a signal to a motor or other drive mechanism to position the cutting wheel 220 into place, and to start rotation of the cutting and forming wheel 220 on an axle 224, such that it will engage the material and adhesive combination 34, 36 and cut the combination (see FIG. 19B).

Once the cut is complete, the cutting wheel 220 moves upwards and out of the way, and then the control board can engage the flipping mechanisms 218. The flipping mechanisms 218 flip the combination over thereby causing the entire front edge of the trim 34 to now be facing back towards itself. Then the control sends a signal to the rollers 204 to lower in place to a preset amount of pressure such that the adhesive 36 sticks to itself and forms tucked portions of the trim 34a,b.

The control then sends a signal to the motor attached to the rollers 204, which then move the rollers 204 back and forth on tucked portions 34,36 such that the pressure the rollers 204 apply is to the entire portion of the tucked ends 34a,b.

Once that operation is completed, the control engages the rollers 204 to move the combination forward to the next preset. As the trim 34a exits the cutting and forming compartment 200, it exits directly below an adhesive roller portion 100.

The operator then pushes the finished trim 34a against the adhesive roller 104, which rotates and applies a liquid adhesive 106 onto the final trim piece to be attached to a garment.

Now referring to FIGS. 20-23, yet another embodiment of a machine or device for applying a decorative trim piece to a textile surface is generally indicted as 300. Similar to device 110, device 300 includes a material holder assembly generally indicated as 20a, a control box 40, a cutting and forming compartment 200, and adhesive compartment 100. It should be noted that, control box 40, cutting and forming chamber 200, and adhesive compartment 100 are essentially the same as for device 110 and will not be detailed for this embodiment of device 300.

Device 300 is designed to accommodate trim material 336 having loose fibers such as, but not limited to feather trims, faux fur trims, and glass bead trims, and includes an appropriate adhesive roll 334. To accommodate feeding trim material 336 into control box 40, material holder assembly 20a is longer than material holder assembly 20 and instead of slot 32 for feeding the material into the control box 40, material holder assembly 20a includes a funnel section generally indicted as 310. Funnel section 310 includes a base 312 for supporting the funnel section.

Funnel section 310 includes a through opening 318, and as can be appreciated, funnel section 310 is wider at its front end opening 318 than it is at its rear end which funnels material 334 into opening 50a of control box 40. Funnel section 310 also includes a surface 314 for aligning fibers of trim material, a front edge 316 to opening 318. Funnel 310 also includes a top edge 320 and a flexible back end 322 that is aligned with opening 50a in control box 40 and that helps to hold and align fibers in material 336. Referring now to FIG. 23A, the direction of fibers as the trim 336 enters funnel section 310 is indicted as 342. Then as the trim material 336 enters funnel section 310, surface 314 compresses the fibers of trim material 336 as shown by 344. From here the combination of trim material and adhesive 336, 334 moves through the control box for heating, and then to the cutting and forming chamber for cutting and forming the trim material as discussed above.

While the invention has been taught with specific reference to these embodiments, one skilled in the art will recognize that changes can be made in form and detail without departing from the spirit and scope of the invention. For instance, the material holding assembly may come equipped with a plurality of funnel sections having different lengths, widths and openings for accommodating different sizes and types of trim materials. Also, the heating compartment can be located at other locations than beneath the heating chamber. Also, a fan or other air moving device may be used to transfer heat as opposed to or in addition to just convection heating. The described embodiments are to be considered, therefore, in all respects only as illustrative and not restrictive. As such, the scope of the invention is indicated by the following claims rather than by the description.

The invention claimed is:

1. A device to prepare a trim material for application to textile surfaces, the device being capable of cutting, folding, and adhering end pieces of the trim material, the device includes:
    a material holder assembly configured to hold and dispense a roll of trim material and a roll of adhesive material;
    a control and heating assembly including control inputs, status indicators, control electronics, a heating element and a heating chamber configured to receive the trim material and the adhesive material from the material holder assembly; and
    a cutting and forming compartment including drive rollers, a cutting device, a folding mechanism configured to fold cut ends of the trim material and the adhesive material, and pressing mechanisms to press the folded cut ends of the trim and adhesive material so that the folded ends are adhered to a remainder of respective trim material lengths.

2. The device to prepare a trim material for application to textile surfaces, the device being capable of cutting, folding, and adhering end pieces of the trim material as set forth in claim 1, further including an adhesive compartment for applying adhesive to a cut and folded length of trim material for application to a textile piece.

3. The device to prepare a trim material for application to textile surfaces, the device being capable of cutting, folding, and adhering end pieces of the trim material as set forth in claim 1, wherein the material holder assembly has a height adjustment to accommodate different sizes of rolls of trim and adhesive materials.

4. The device to prepare a trim material for application to textile surfaces, the device being capable of cutting, folding, and adhering end pieces of the trim material as set forth in claim 3, wherein the material holder assembly includes a base portion and a top portion, and the roll of trim material is mounted for rolling disbursement of the trim material on either the base or top portion, and the roll of adhesive material is mounted for rolling disbursement on the other of either the base or top portion.

5. The device to prepare a trim material for application to textile surfaces, the device being capable of cutting, folding, and adhering end pieces of the trim material as set forth in claim 4, wherein one of the base or top portion of the material holder assembly includes a receiving slot, and the other of the base or top portion includes an extension movably receivable in the receiving slot to facilitate the height adjustment of the material holder assembly.

6. The device to prepare a trim material for application to textile surfaces, the device being capable of cutting, folding, and adhering end pieces of the trim material as set forth in claim 1, including a heating element compartment having openings in communication with the heating chamber to facilitate transfer of heat thereto.

7. The device to prepare a trim material for application to textile surfaces, the device being capable of cutting, folding, and adhering end pieces of the trim material as set forth in claim 6, wherein the heating element compartment is located below the heating chamber and heat transfers to the heating chamber by convection.

8. The device to prepare a trim material for application to textile surfaces, the device being capable of cutting, folding, and adhering end pieces of the trim material as set forth in claim 1, wherein the cutting and forming compartment includes rollers as part of the pressing mechanisms.

9. The device to prepare a trim material for application to textile surfaces, the device being capable of cutting, folding, and adhering end pieces of the trim material as set forth in claim 8, wherein the drive rollers also act as pressing rollers of the pressing mechanisms.

10. The device to prepare a trim material for application to textile surfaces, the device being capable of cutting, folding, and adhering end pieces of the trim material as set forth in claim 9, wherein the cutting device includes a translatable wheel and the folding mechanism includes arced slots to facilitate movement of the folding mechanism.

11. The device to prepare a trim material for application to textile surfaces, the device being capable of cutting, folding, and adhering end pieces of the trim material as set forth in claim 10, wherein the drive rollers are translatable for bringing into contact with and removing from the trim material.

12. The device to prepare a trim material for application to textile surfaces, the device being capable of cutting, folding, and adhering end pieces of the trim material as set forth in claim 8, wherein the cutting device includes a cutting and forming wheel including a cutting knife and a forming portion that folds the cut ends of the trim material.

13. The device to prepare a trim material for application to textile surfaces, the device being capable of cutting, folding, and adhering end pieces of the trim material as set forth in claim 1, wherein the material holder assembly includes a funnel section for accommodating trim material having loose ends.

14. The device to prepare a trim material for application to textile surfaces, the device being capable of cutting, folding, and adhering end pieces of the trim material as set forth in claim 13, wherein the funnel section includes a surface for aligning fibers of the material.

\* \* \* \* \*